United States Patent
Kanayama

(10) Patent No.: US 7,348,897 B2
(45) Date of Patent: Mar. 25, 2008

(54) APPARATUS FOR TRANSMITTING POSITION DETECTION SIGNAL OF MULTI-SHAFT MOTOR

(75) Inventor: Naoki Kanayama, Azuminio (JP)

(73) Assignee: Harmonic Drive Systems Inc., Tokyo (JP)

( * ) Notice: Subject to any disclaimer, the term of this patent is extended or adjusted under 35 U.S.C. 154(b) by 0 days.

(21) Appl. No.: 11/613,402

(22) Filed: Dec. 20, 2006

(65) Prior Publication Data
US 2007/0171104 A1 Jul. 26, 2007

(30) Foreign Application Priority Data
Jan. 17, 2006 (JP) .............................. 2006-008163

(51) Int. Cl.
H03M 1/22 (2006.01)
(52) U.S. Cl. .......................... 341/17; 341/112; 341/192
(58) Field of Classification Search ............ 341/15–17, 341/32–34, 192
See application file for complete search history.

(56) References Cited

U.S. PATENT DOCUMENTS

| | | | |
|---|---|---|---|
| 5,034,965 A * | 7/1991 | Kato ........................... | 375/243 |
| 5,742,143 A * | 4/1998 | Katagiri ....................... | 318/625 |
| 5,760,707 A * | 6/1998 | Katagiri ................. | 340/870.11 |
| 6,091,219 A * | 7/2000 | Maruo et al. ................ | 318/562 |
| 6,407,683 B1 * | 6/2002 | Dreibelbis ................... | 341/111 |
| 6,761,552 B2 * | 7/2004 | Fujita .......................... | 425/145 |
| 6,781,435 B1 * | 8/2004 | Gupta et al. ................. | 327/407 |
| 6,801,874 B2 * | 10/2004 | Strasser ....................... | 702/150 |
| 6,943,521 B2 * | 9/2005 | Kurokawa et al. ........... | 318/625 |
| 6,996,494 B2 * | 2/2006 | Braasch et al. ............. | 702/150 |
| 2001/0001540 A1 * | 5/2001 | Okamuro et al. ........... | 324/644 |
| 2002/0185926 A1 * | 12/2002 | King et al. ............... | 310/68 B |
| 2006/0186852 A1 * | 8/2006 | Sasaki et al. ................ | 318/638 |

FOREIGN PATENT DOCUMENTS

JP 11-175118 A 7/1999

* cited by examiner

Primary Examiner—Linh Nguyen
(74) Attorney, Agent, or Firm—Buchanan Ingersoll & Rooney PC

(57) ABSTRACT

An apparatus for transmitting a position detection signal of a multi-shaft motor whereby a parallel-form detection signal that is output from position-detecting devices disposed on each of a plurality of motors and used for indicating a motor rotation position can be transmitted to motor drivers for controlling the driving of the motors via a group of a small number of wires. In the apparatus for transmitting a position detection signal of a multi-shaft motor, a transmission-side converter converts a parallel-form detection signal from rotary encoders to a serial signal and presents the resulting signal to a reception-side converter via a serial signal transmission path. The reception-side converter returns the received serial-form detection signal to a parallel-form signal and presents the signal to motor drivers.

1 Claim, 1 Drawing Sheet

APPARATUS FOR TRANSMITTING POSITION DETECTION SIGNAL OF MULTI-SHAFT MOTOR

BACKGROUND OF THE INVENTION

1. Field of the Invention

The present invention relates to a multi-shaft driving device comprising a plurality of motors for driving an articulated robotic hand or another plurality of operational shafts, and in particular relates to an apparatus for transmitting a position detection signal of a multi-shaft motor that is capable of transmitting, via a small number of wires, a detection signal from a plurality of position-detecting devices for detecting a rotation position of the motors to motor drivers for controlling the driving of the motors.

2. Description of the Related Art

A plurality of motors, e.g., servomotors, for driving operational shafts, is disposed on an articulated robotic hand or other multi-shaft driving device. A rotary encoder or other position-detecting device for detecting the rotation positions of the servomotors is attached to the servomotors. Motor drivers for controlling the driving of the servomotors control the driving of the servomotors on the basis of a position command provided from a host computer or the like, and on the basis of an actual rotation position of the servomotors that are based on a detection signal from the rotary encoders.

In such a multi-shaft driving device comprising a plurality of motors, a driving-side mechanism provided with the motors and position-detecting devices is connected via a large number of wires to the motor drivers for controlling the driving of the motors. For example, in a rotary encoder, A-phase and B-phase signals having 90° in phase difference with each other, as well as a Z signal indicating the position of an origin, are output and transmitted to a motor driver via a parallel signal transmission path. A plurality of signal wires is needed for each rotary encoder. Therefore, in a multi-shaft driving device comprising a plurality of motors, many wires extend from the rotary encoders attached to the motors, and a space for laying the wires must be maintained. In addition, when the number of wires increases, the probability of the wires disconnecting accordingly increases as well.

In JP-A 11-175118, it is proposed that the detection signal from the rotary encoders is output using a serial signal configuration in order to reduce the number of wires involved. The signal is accordingly transmitted to a motor driver via a serial signal transmission path having a fewer number of wires than is traditionally employed.

SUMMARY OF THE INVENTION

An object of the present invention is to provide an apparatus for transmitting a position detection signal of a multi-shaft motor that is capable of transmitting, over a small number of wires, a detection signal from a position-detecting device disposed on the respective motors to the respective motor drivers by directly using the motor position-detecting device for outputting a parallel signal configuration detection signal.

To achieve the above-mentioned object, the present invention provides an apparatus for transmitting a position detection signal of a multi-shaft motor whereby a parallel-form detection signal that is output from position-detecting devices disposed on each of a plurality of motors and used for indicating a motor rotation position is transmitted to motor drivers for controlling the driving of the motors, the apparatus comprising:

a transmission-side converter provided with a serialization circuit;

a reception-side converter provided with a deserialization circuit;

an encoder-side parallel signal transmission path for connecting the position detectors and the transmission-side converter;

a driver-side parallel signal transmission path for connecting the reception-side converter and motor drivers; and a serial signal transmission path for connecting the transmission-side converter and the reception-side converter; wherein the transmission-side converter converts, to serial signals, parallel-form detection signals provided from the position-detecting devices via the encoder-side parallel signal transmission paths, and presents the resulting signals to the reception-side converter via the serial signal transmission path; and the reception-side converter returns the received serial-form detection signals to parallel-form signals and presents the resulting signals to the motor drivers via the driver-side parallel signal transmission path.

In the apparatus for transmitting a position detection signal of a multi-shaft motor according to the present invention, the parallel signal output from the position-detecting devices is converted to a serial signal using a signal converter called a SERDES (serialization/deserialization). The detection signal from the position-detecting devices is thereby transmitted to the motor drivers via a serial signal transmission path composed of a small number of signal wires. Therefore, the number of signal wires for connecting the drive side on which the position-detecting devices are disposed and the side of the motor drivers can be reduced by directly using the position-detecting devices.

DESCRIPTION OF THE PREFERRED EMBODIMENTS

Figure 1:
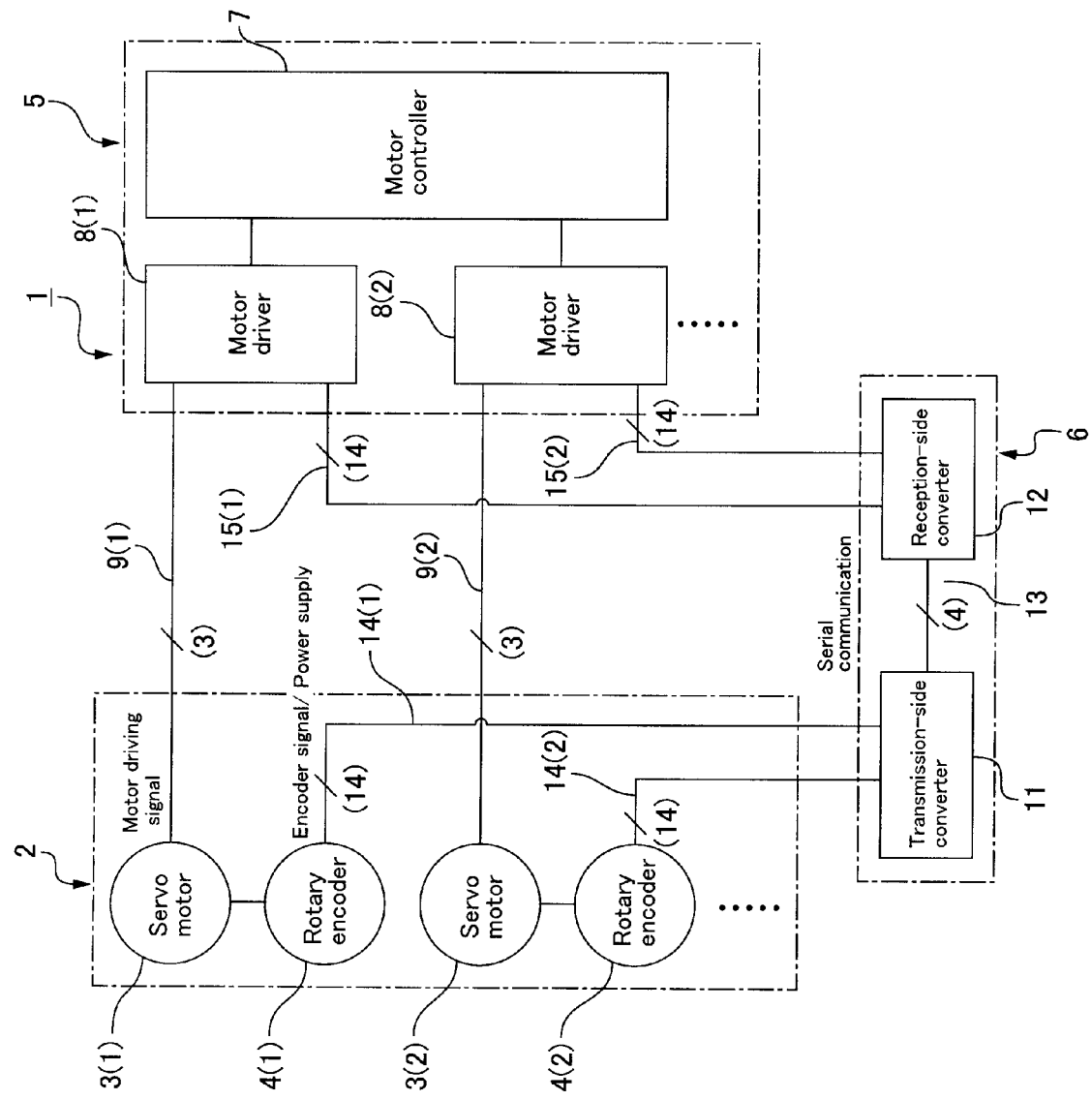
FIG. 1 is a schematic block diagram of a multi-shaft driving device according to the present invention.

An embodiment of a multi-shaft driving device using the present invention will be described with reference to the drawing.

FIG. 1 is a schematic block diagram showing a multi-shaft driving device that can be used in an articulated robotic hand or other device in which the present invention is employed. The multi-shaft driving device 1 of the present example has a drive-side mechanism 2 that comprises a plurality of servomotors 3(1), 3(2) . . . and rotary encoders 4(1), 4(2) . . . attached to the servomotors 3(1), 3(2) . . . The device 1 also has a motor drive control device 5 for controlling the driving of the servomotors 3(1), 3(2) . . . The device 1 further has an apparatus 6 for transmitting a position detection signal of a multi-shaft motor for transmitting a parallel-form detection signal output from the rotary encoders 4(1), 4(2) . . . to the motor drive control device 5.

The motor drive control device 5 comprises a controller 7 and a plurality of motor drivers 8(1), 8(2) . . . that correspond to the servomotors 3(1), 3(2) . . . . Under the control of the controller 7, the motor drivers 8(1), 8(2) . . . provide driving electrical power from the motor drivers 8(1), 8(2) . . . to the servomotors 3(1), 3(2) . . . via motor driving wires 9(1), 9(2) . . . and drive the servomotors so that the rotation positions of the servomotors 3(1), 3(2) . . . detected by the rotary encoders 4(1), 4(2) . . . match the rotation positions according to a position command provided from a host device (not shown).

The apparatus 6 for transmitting a position detection signal of a multi-shaft motor has a transmission-side converter 11 provided with a serialization circuit, a reception-side converter 12 provided with a deserialization circuit, and a serial signal transmission path for connecting the transmission-side converter 11 and the reception-side converter 12. The reception-side converter 12 and the motor drivers 8(1), 8(2) . . . are connected via driver-side parallel signal transmission paths 15(1), 15(2) . . . , respectively. The transmission-side converter 11 and the motor drivers 4(1), 4(2) . . . are also connected via encoder-side parallel signal transmission paths 14(1), 14(2) . . . , respectively.

On receiving the parallel-form detection signals output from the rotary encoders 4(1), 4(2) . . . via the encoder-side parallel signal transmission paths 14(1), 14(2) . . . , the transmission-side converter 11 assembles and converts the signals to a serial signal configuration, and provides the resulting signal to the reception-side converter 12 via the serial signal transmission path 13. In the reception side converter 12, the received serial-form detection signal is returned to a parallel signal configuration and is presented to the motor drivers 8(1), 8(2) . . . via the driver-side parallel signal transmission paths 15(1), 15(2) . . .

In the present example, each of the motor-driving wires 9(1), 9(2) . . . includes three lines. There are fourteen signal wires in each of the encoder-side parallel signal transmission paths 14(1), 14(2) . . . between the rotary encoders 4(1), 4(2) . . . and the transmission-side converter 11, and in each of the driver-side parallel signal transmission paths 15(1), 15(2) . . . between the reception-side converter 12 and the motor drivers 8(1), 8(2) . . . There are also two signal wires and two electrical power wires in the serial signal transmission path 13 for a total of four wires. These wire counts are examples, and different wire counts are also possible.

In addition, in the present example, a rotary encoder is used as a motor position-detecting device. However, a linear encoder can also be used in the same manner. A magnetic sensor, potentiometer, or the like can also be used as the position-detecting device by converting the detection signals therefrom to digital signals.

Furthermore, in the present example, an electric wire is used as the transmission path for the serialized detection signal. However, it is also possible to convert a digital signal to an optical signal, and either optically transmit the signal using an optical fiber or wirelessly transmit the signal using infrared rays or a laser.

What is claimed is:

1. An apparatus for transmitting a position detection signal of a multi-shaft motor whereby a parallel-form detection signal that is output from position-detecting devices disposed on each of a plurality of motors and used for indicating a motor rotation position is transmitted to motor drivers for controlling the driving of the motors, said apparatus comprising:

a transmission-side converter provided with a serialization circuit;

a reception-side converter provided with a deserialization circuit;

an encoder-side parallel signal transmission path for connecting the position detectors and the transmission-side converter;

a driver-side parallel signal transmission path for connecting the reception-side converter and motor drivers; and a serial signal transmission path for connecting the transmission-side converter and the reception-side converter; wherein the transmission-side converter converts, to serial signals, parallel-form detection signals provided from the position-detecting devices via the encoder-side parallel signal transmission path, and presents the resulting signals to the reception-side converter via the serial signal transmission path; and the reception-side converter returns the received serial-form detection signals to parallel-form signals and presents the resulting signals to the motor drivers via the driver-side parallel signal transmission path.

\* \* \* \* \*